(No Model.)

H. P. DAVIS.
CONTROLLER FOR ELECTRIC CARS.

No. 532,538. Patented Jan. 15, 1895.

WITNESSES:

INVENTOR,
Harry P. Davis
BY Terry & MacKay
ATTORNEYS

UNITED STATES PATENT OFFICE.

HARRY P. DAVIS, OF PITTSBURG, PENNSYLVANIA, ASSIGNOR TO THE WESTINGHOUSE ELECTRIC AND MANUFACTURING COMPANY, OF SAME PLACE.

CONTROLLER FOR ELECTRIC CARS.

SPECIFICATION forming part of Letters Patent No. 532,538, dated January 15, 1895.

Application filed April 14, 1894. Serial No. 507,516. (No model.)

*To all whom it may concern:*

Be it known that I, HARRY P. DAVIS, a citizen of the United States, residing at Pittsburg, in the county of Allegheny and State of Pennsylvania, have invented a new and useful Improvement in Controllers for Electric Cars, (Case No. 594,) of which the following is a specification.

My invention relates to controllers for electrically propelled vehicles; and particularly to certain safety devices in connection therewith.

The object of my invention is to provide a form of controller and co-operating handles, whereby the proper position of the controller may be insured before the handles for moving the same can be removed.

It is customary in the use of electric cars to provide a controller at each end thereof, so that the driver may occupy the front platform in whichever direction the car is running. In general the same handle is used for each controller and when the car reaches the end of a trip, and it is desired to travel in the opposite direction, the driver or motorman removes the handles from one controller and fits them to the other.

The general principle of my invention is applicable to either the controlling handle or the reversing handle, and in the accompanying drawings it is shown applied to both.

Figure 1:
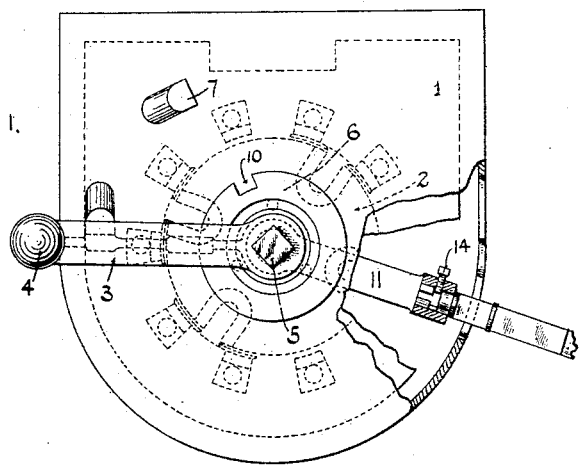
Figure 2:
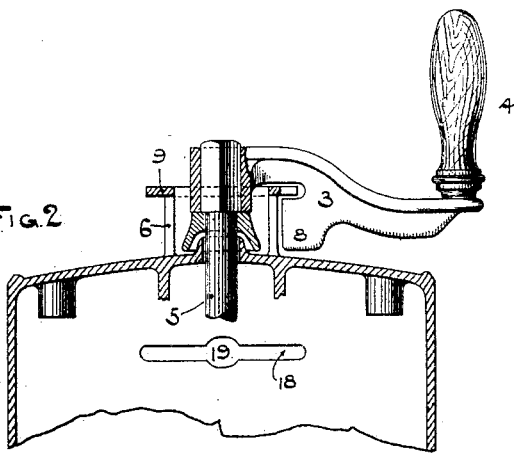
Figure 3:
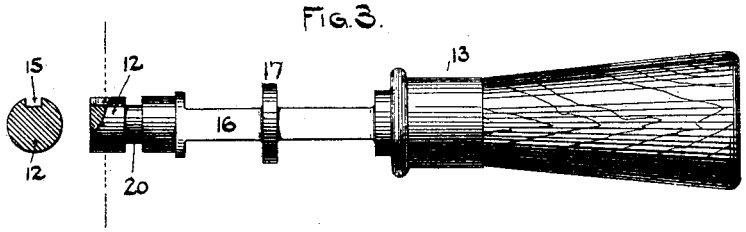

In the drawings, Figure 1 is a top view of a controller casing, a portion of the casing being broken away to show in detail the means whereby the reversing handle is applied to its switch. Fig. 2 is a vertical section of a controller casing provided with my invention as applied to both switch handles, and Fig. 3 is a detail view of the reversing switch handle, and a section showing the position of the notch thereon.

In the drawings the casing containing any form of controlling switch is shown at 1, the reversing switch, which in the form shown is operated by its own separate handle is shown in dotted lines at 2. The controlling switch is generally operated by means of a crank 3 and handle 4, removably fitting over the squared end of the operating axle 5. The difficulty which arises when the handle is removed as above described is that the driver may, if a little careless, leave the controlling switch in such a position that contact is maintained and connection made between the trolley and the motor. In order to insure the complete discontinuity of the driving circuit at the controller about to be left at the rear of the car, I have provided a guard shown at 6, adapted to co-operate with a properly shaped crank 3 to prevent the removal of said crank when there is contact between the movable and stationary conducting points of the controller.

As indicated in Fig. 1, the crank should be brought into contact with the stop 7 when the handle is removed, and the guard 6 is adapted to permit removal only under these circumstances.

The crank 3 is provided with a beak 8 adapted to project under the flange 9 of the guard, and thus to prevent removal of the handle save when the slot 10 is cut through said flange, which slot, as shown in Fig. 1, is so placed that the crank must come against the stop 7 before the beak reaches the slot. The same broad principle is embodied in the means devised by me for insuring the withdrawal of the reversing handle at the proper point. It is of course necessary that, when either controller is abandoned its reversing switch should be in its middle position, or at the point of no contact, in order that, when the trolley is applied to the wire there may be no danger of a circuit through this reversing switch. The use of a guard on both handles in controllers where both are used is therefore a double precaution against danger.

In the form of guard for the reversing switch handle which I have shown herein, the reversing lever 11 is shown as provided with a socket adapted to receive the rounded end 12 of the handle 13. Into the side of this socket, a pin 14 projects, which may, as shown be provided with a set screw. Upon the end 12 of the handle a slot 15 is provided which registers with the pin 14 when the flat portion or web 16 of the handle is vertically placed. A flange 17 is preferably employed upon the handle 13 to act as a stop. The end of the lever 11 is within the casing, as shown, and the end of the handle 13 must be projected through the guard slot 18 in order to adjust it to the lever 11. This guard slot is provided with a vertically enlarged portion, 19.

In operation, the handle 13 is turned so that the plane of the web 16 is vertical. The enlargement 19 permits the ends 12 and the part 16 to be projected through the casing, and the handle can thus be thrust to its seat, so that the pin 14 occupies the groove 20 where it is entered by the slot 15. The handle can then be turned on its own axis until the part 16 lies horizontally so that it cannot be withdrawn from the socket in the lever 11, it being held there by the pin 14. In this position the slot 18 permits rotation of the reversing switch by pushing the handle 13 in one direction or the other. Such movement is not possible, however, when the web 16 is vertical, the slot 18 not being wide enough to receive the handle in this position. It will be seen that it is impossible to remove the handle from the lever 11 when the web 16 is horizontal, but said web can only be turned out of the horizontal when in the enlargement 19, or in other words, when the handle and its switch are in the middle position.

The various details shown herein may be modified in many ways without departing from the spirit of my invention, and I do not desire to limit myself thereto.

What I claim is—

1. A switch, a handle removable therefrom only when in a certain position relative to said switch and means for preventing occurrence of said relative position of handle and switch, save when the switch is in one predetermined position, substantially as described.

2. In a controller for electric cars, having a reversing switch and its lever within the casing thereof, a slot in said casing having an enlargement at one point thereof, a socket in the end of the switch lever, and a handle having a web portion wider than the narrow portion of said slot, the end of said handle being adapted to enter said socket when said web portion lies at right angles to the direction of said slot, substantially as described.

In testimony whereof I have hereunto subscribed my name this 11th day of April, A. D. 1894.

HARRY P. DAVIS.

Witnesses:
JAMES W. SMITH,
HAROLD S. MACKAYE.